Dec. 1, 1959 G. H. RAPAPORT 2,915,023
METHOD AND APPARATUS FOR MIXING ICINGS, CAKE
BATTERS AND THE LIKE
Filed Jan. 13, 1956 3 Sheets-Sheet 1

INVENTOR.
Gustave H. Rapaport.
BY
Fishburn and Gold
ATTORNEYS.

Dec. 1, 1959  G. H. RAPAPORT  2,915,023
METHOD AND APPARATUS FOR MIXING ICINGS, CAKE
BATTERS AND THE LIKE
Filed Jan. 13, 1956  3 Sheets-Sheet 3
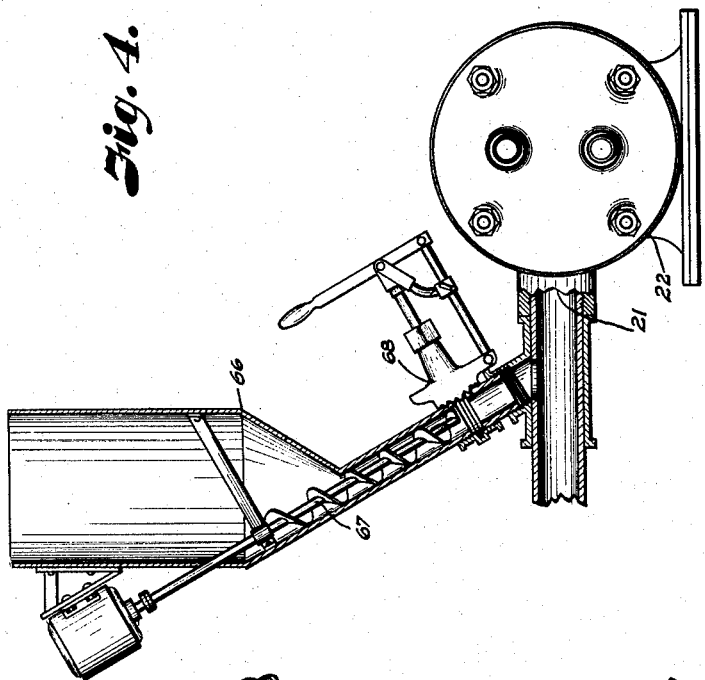
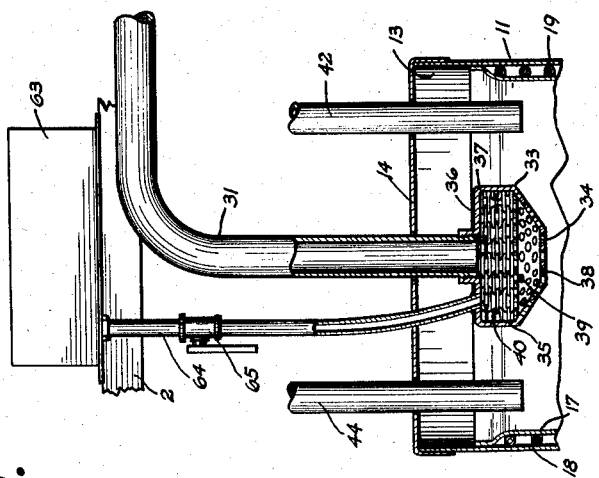
INVENTOR.
Gustave H. Rapaport.
BY
Fishburn and Gold
ATTORNEYS.

United States Patent Office 2,915,023
Patented Dec. 1, 1959

2,915,023

METHOD AND APPARATUS FOR MIXING ICINGS, CAKE BATTERS AND THE LIKE

Gustave H. Rapaport, Kansas City, Mo.

Application January 13, 1956, Serial No. 558,904

4 Claims. (Cl. 107—31)

This invention relates to icings and novel apparatus and process for production thereof for use on baked goods and other mixed powder and liquid materials such as cake batters and the like wherein a smooth homogeneous composition is desired.

Icings used on baked goods such as sweet rolls, milk bread, etc., usually consist basically of sugar and/or fondant and water to which flavoring ingredients, honey, shortening, spices and coloring may be added. In order to give such icings extended shelf life, it is customary to use stabilizers which prevent such icings from melting away or becoming too brittle. This is especially important where such baked goods are wrapped immediately after they have been baked and cooled and where such icings should retain shelf life over several days without losing their appearance and retain their flexibility without sticking to the wrappers. Icings have been dried for approximately thirty minutes before wrapping. However, in modern plants, the baked goods are often wrapped immediately after icing, sometimes within a period of from thirty to sixty seconds while the icings are still warm.

A preparation and application of a conventional icing may consist broadly of four steps. One, the cooking of the icing base stabilizer with all the liquid contained in the formula. Two, the transfer of the cooked solution into a cake mixing machine or the like and mixing therewith powdered sugar by stirring action. Three, the transferring of the icing into holding vessels. Four, the transfer of the icing from the holding vessels into icing machines or applicators and application of the icing to the baked goods. In conventional icings, better keeping properties are obtained when products of a colloidal nature which have the ability to form gels on cooling and thus retain their shape are used as stabilizers. Various colloidal substances are used as stabilizers, such as vegetable gums, hydro colloids, egg albumen, gelatin, etc., to obtain the desired properties such as flexibility and ability to form the non-adhesive film immediately after application. Such stabilizers or icing bases are mostly combinations of several synergistic colloids. The conventional way of preparing such icings is to boil or dissolve such colloids in the proper amount of water usually from 14 to 20 percent by weight of the powdered sugar with or without the addition of some granulated sugar and adding this hot solution to powdered sugar in a cake mixer until a smooth dispersion of the powdered sugar is obtained. Such icings are then transferred into icing machines which apply the icings to the baked goods either under pressure or by gravity flow. Since some icings are thermosetting, it is necessary, in order to liquefy the icings and make them flowable enough for use in the applicator, to reheat the icings to an elevated temperature, especially if some time elapses between the mixing of the icing and its application. With many colloidal substances, this is very difficult to achieve because the melting temperatures of such icings are often considerably higher than the temperatures at which they gel, as for example, in the case of icings containing carragheen; also, some stabilizers once they have been chilled below a certain temperature form insoluble gels such as certain alginates and icings having such stabilizers therein are either difficult or impossible to reliquefy, and materials which have gelled because they could not be used immediately may have to be discarded. If the conventional procedure of mixing is reversed, as by putting the liquid phase in the mixing bowl and adding the sugar thereto, suitable mixing would be substantially impossible because the powdered sugar tends to form lumps when added to a large quantity of water and the large lumps of sugar which would form cannot be broken up by the subsequent mixing. While some of the colloid materials may be used without the application of heat, such stabilizers are usually composed of materials some of which have to be boiled to dissolve, such as agar agar. The liquid phase of such icings is usually boiled before use in order to obtain a complete solution of the stabilizing compound and added hot to the powdered sugar and applied at an elevated temperature, thus partly utilizing the principle of thermosetting. Reactions may also occur during boiling between components of the stabilized materials resulting in the compound having different properties from each of the original components. It is also sometimes difficult to obtain accurate measurement of the amount of water due to loss in evaporation during boiling.

Some of the colloids used in icing bases are of gel forming nature while others simply increase or modify its hydrophillic properties. They have in common the ability to imbibe relatively large quantities of water which upon addition to the icings are partly released to dissolve the sugar and they form a colloidal protective coating around the sugar particles. One of the great disadvantages encountered in connection with the use of such colloid is the fact that such icings once they are left standing for some period of time tend to set up or gel and lose their pliability and become too firm to be handled in the customary manner. Such setting up, which makes the icing unusable without the addition of more water than was originally required by the formula, may be due to a continued reaction between the component parts of the stabilizing substances or to a continued imbibition by some of the component parts of the stabilizer. It makes it necessary to remix the finished icing with the addition of more water or simple syrup in order to make it flexible enough to be applied on the baked goods. Such free water will, however, when gelling substances are used, cause the presence of free moisture which cannot enter gels already formed and thus deteriorate the icing to a point at which will cause the solution of sugar from the gels already formed to promote syneresis and thus melt down part of the icing making the baked goods unsalable. One the other hand, a continuation of the reaction between the component parts of icing bases may also cause the stabilizing substances to imbibe additional excessive quantities of water after the icings have been applied and wrapped, thus reducing their cohesion and flexibility and making such icings brittle to the point where they will lose their gloss, chip, crack and peel off the baked goods.

The objects of the present invention are to provide a method of preparing icings and the like which eliminates the above-mentioned difficulties encountered in the conventional method; to provide a method and apparatus for making icings and the like that have improved flowability, clarity, flexibility and appearance, and that are smoother and faster drying; to provide such a method wherein the liquid phase of the formula is placed in a container, the powdered phase gradually added thereto while the material is drawn from the container, passed through a colloidal mill, disintegrator or grinder, and then forced under pressure through a homogenizing head having a plurality of small passages to divide the flow into many small streams, and then returned to the container, the circulation continuing at high speed and high pressure until a smooth dispersion and homogeneous product is obtained; to provide such a method and apparatus wherein the mill is a gear pump or the like in which the icing mixture is crushed, mashed or wiped between relatively moving surfaces as it passes therethrough; to provide such apparatus wherein the recirculating pressure means is used for delivering a portion of the product to applicating machines as recirculation continues to keep the product in motion and retard setting thereof or formation of thixotropic gels; to provide an improved process wherein smoother, faster drying icings are prduced even with a reduction of up to 20 percent of the powdered sugar of the formula; to provide such apparatus with means for introducing air into the material during preparation of the finished product for aerating same; and to provide a novel, efficient method and apparatus for preparing icings and the like of improved characteristics for application to baked goods and give improved appearance thereto that will be retained for a relatively long shelf life.

In accomplishing these and other objects of the present invention, I have provided improved details of structure, the preferred forms of which are illustrated in the accompanying drawings, wherein:

Fig. 3 is a modified form of the structure for introducing air to the product.

Fig. 4 is a modified form of the apparatus for introducing dry materials to the product being produced.

Figure 1:
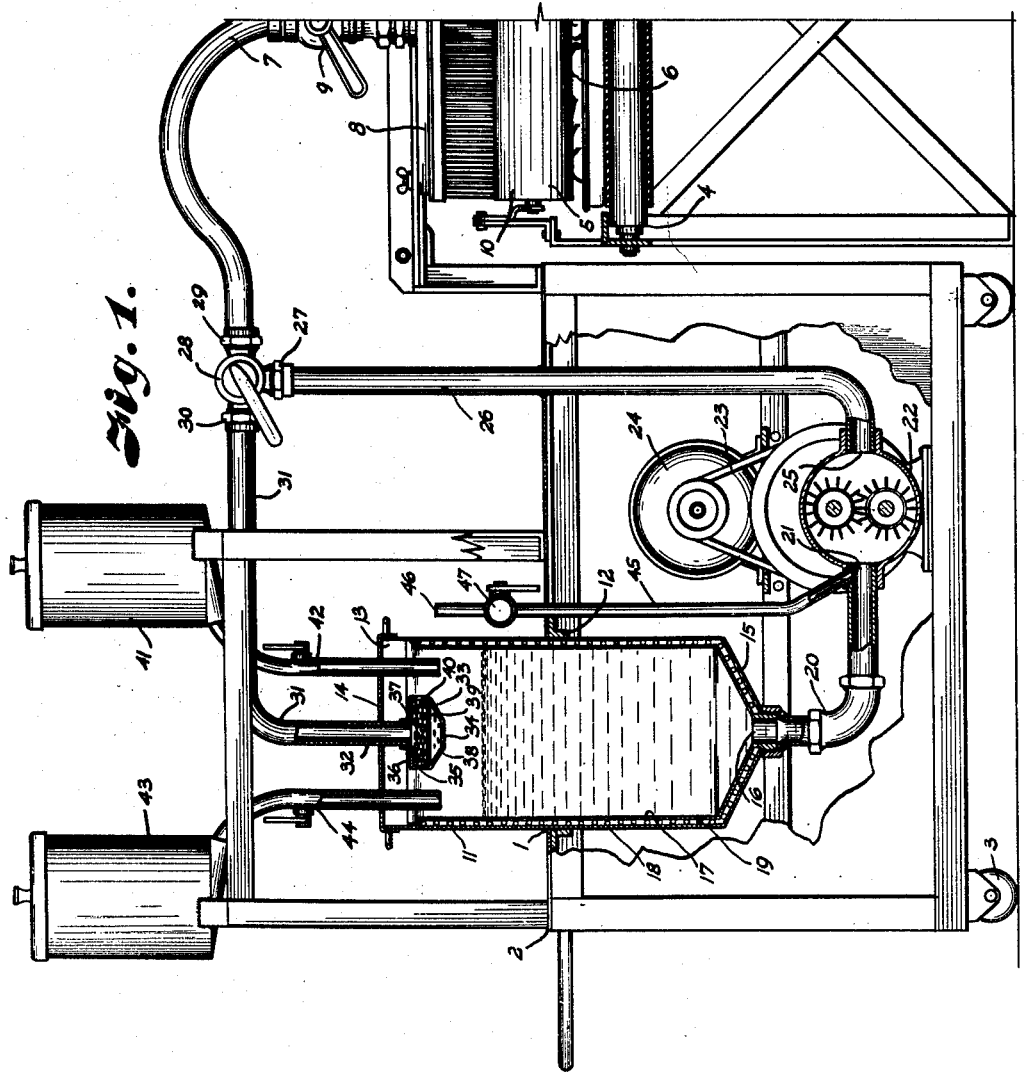
Fig. 1 is a vertical sectional view through the icing preparing apparatus.

Referring more in detail to the drawings:

1 designates apparatus for producing icings and the like which includes a frame 2 preferably supported on rollers 3 for movement adjacent to a baked goods conveyor apparatus 4 having a distributor 5 for applying icings to baked goods 6 carried on the conveyor. The icing applicator may be of any conventional structure to which in the form illustrated icing is supplied through a tubing 7 to a manifold 8 under control of a valve 9, and the manifold flows the icing onto a heated roller 10 forming part of the applicator which by rotation transfers the icing to the baked goods moving under the roll.

A kettle or suitable container 11 is supported in the frame by means of brackets 12. The kettle 11 is preferably arranged vertically and is cylindrical in cross section and has an open top 13 closed by a cover 14 and a downwardly sloping bottom 15 terminating in a drain opening 16. The inner wall 17 of the kettle is preferably formed of non-corrosive metal such as stainless steel surrounded by an outer jacket 18 spaced therefrom. The outer jacket 18 is preferably insulated and temperature controlling medium is applied to the space between the inner wall 17 and jacket 18, as, for example, a plurality of tubes 19 arranged in said space and steam circulated therein to heat the kettle as for cooking the liquid phase of an icing prior to the addition of the powder phase and for maintaining a desired temperature during the mixing. Also, refrigerant may be circulated through the tubing 19 when the material being prepared is such that it cannot stand the heat of friction such as meringues, toppings or cake batters. Electrical heating elements or other conventional heating or cooling devices may be utilized in place of the steam jacket, if desired.

The outlet or drain opening 16 of the kettle is connected by suitable pipe fittings or tubing 20 to the inlet 21 of a disintegrator and pump structure 22 supported on the frame 2 preferably at a level slightly below the drain opening 16 of the kettle. The pump 22 is operatively connected by a belt or the like 23 to a suitable motor or other driving mechanism 24. The outlet connection 25 of the disintegrator pump structure is connected by piping or tubing 26 to one branch 27 of a three-way valve 28. Another branch 29 of the valve is connected by the tubing 7 to the valve 9. The branch 30 of the valve is connected by piping 31 which extends through an opening 32 in the cover 14 of the kettle 11 and discharges into a homogenizing head 33 in the upper portion of the kettle. The three-way valve 28 is preferably of the plug type with a passage therein whereby flow from the piping 26 is selectively directed through either branch 29 or the branch 30.

The disintegrator and pump 22 is illustrated as a gear pump whereby the material is drawn therein and discharged at high speed and high pressure with the operating elements such as gears or rotors having operating surfaces which substantially rub together to provide a crushing and wiping action on the material as it moves between the operating surfaces.

The homogenizing head 33 preferably includes a bottom wall 34, side walls 35 and a top wall 36, the top wall being connected to the tubing 31, the walls of said head defining a cavity 37 therein. The bottom wall 34 has a plurality of apertures 38 through which material can flow, and in the cavity between the bottom wall and top wall are preferably restricted aperture or passage forming structures such as a plurality of spaced perforated discs 39 each of which has a plurality of small apertures therein through which the material is forced. In the spaces between the perforated discs, it is preferable to have objects 40 designed to restrict the flow of the material therethrough, and said objects may be balls, Raschig rings of the like; however, I have also found that a length of chain wound around in a spiral provides a large number of openings defined by the members thereof which tend to restrict the flow of the material therethrough. The chains also are such that they can be easily removed, cleaned and sterilized.

In the illustrated structure, a hopper 41 is supported on the upper portion of the frame 2 above the kettle 11 for receiving the liquid phase of the icing or like product to be prepared. The hopper 41 has a valve controlled flow duct 42 which leads into the upper portion of the kettle 11 for discharge of selected quantities of liquid into the kettle. A hopper 43 for containing the dry phase of the icing product is also supported on the upper portion of the frame 2 and connected by a valve controlled flow duct 44 which extends into the upper portion of the kettle 11 for feeding desired quantities of powdered material into said kettle.

An air duct 45 having an inlet 46 preferably adjacent the upper end of the kettle 11 is connected to the inlet portion 21 of the pump 22, a valve 47 being arranged in the duct for control of air flow therethrough. When the pump is operated, it tends to draw air through the duct 45 to aerate the material passing through the pump. Adjustment of the valve 47 regulates the extent of aeration or volume of the air introduced into the material.

While the kettle 11 may be used to cook the liquid phase of the icing, it is feasible that said liquid be cooked separately and then placed into the hopper 41. As an example of an icing material and its preparation in the apparatus, five pounds of granulated sugar are premixed with one pound of base composed of colloidal substances such as described above, and added with four pounds of shortening to twenty-four pounds of water. This liquid phase of the icing is then subjected to heat and brought to a boil and boiled for one minute. The hopper 41 may be equipped with electric heating elements to effect the cooking of the liquid phase. Then the valve in the duct 42 is opened and the cooked liquid phase of the icing delivered to the kettle 11. The valve 28 is then adjusted whereby the branches 27 and 30 are in communication and the branch 29 closed. The valve 47 is also closed. Then the motor 24 is energized to drive the pump 22 which draws the liquid through the drain opening 16, tubing 20, to the pump which delivers same at relatively high velocity and pressure through the tubing 26, valve 28 and tubing 31 to the homogenizing head 33 which sprays said liquid back into the kettle 11 in relatively high velocity jets directed both to the sides and into the surface of the liquid remaining in the kettle. One hundred pounds of powdered sugar is placed in the hopper 43 and the valve duct 44 opened whereby the powdered sugar is gradually delivered into the kettle 11. The operation of the pump is continued and the sprays from the homogenizing head tend to mix the powdered sugar with the liquid whereby the powdered sugar is drawn with the liquid through the pump 22. The powder and liquid are both passed through the pump in intimate contact with the operating surfaces thereof as by the gear teeth effecting a rubbing or wiping action on the powder that tends to crush same and provide a more intimate contact between the liquid and the powder. This operation is continued to effect the recirculation while the powdered sugar is added to the kettle, and after completion of the addition of the powdered sugar until the desired degree of smoothness of the icing is obtained. Then the valve 47 can be opened to allow entry of air into the pump for mixture with the icing material to effect the desired aeration of same. After the icing has been completed, the valve 28 is operated whereby a portion of the icing delivered by the pump 22 is forced through the tube 7 with the majority of the pump flow recirculated through the homogenizing head 33 and kettle 11. During this operation, the valve 9 is opened sufficiently to deliver a quantity of the icing to the manifold 8 for transfer to the baked goods on the conveyor apparatus. This continued recirculation maintains a smoothness of the icing and eliminates any possibility of setting prior to actual application to the baked goods. With this form of the apparatus, the icing or other material is prepared in batch forms and after the icing has all been removed from the kettle 11, it is then ready to prepare a second batch, the liquid phase of which has been heated in the meantime in order to be ready to deliver to the kettle 11.

Another example of an icing that can be prepared is of a formula whereby 20 pounds of cold water and 10 pounds of a commercial icing base composed of suitable colloids dispersed in sugar and other polysaccharides are added and the mixture placed in the kettle 11, or if desired the said ingredients may be placed individually in the kettle. Then the pump 22 is operated to effect recirculation of the liquid for approximately four or five minutes, all the liquid being forced through the homogenizing head 33. Then 100 pounds of powdered sugar are gradually added to the kettle 11 while the liquid is kept in motion by recirculation with the pump 22 forcing the material at high velocity and high pressure through the head 33. The recirculation is continued until the icing mixture has become substantially uniform or homogeneous and smooth and then it can be transferred to hold vessels or to the icing machine to be applied to the baked goods as desired. Other formulas of icings may be prepared in a similar way, the variation being in the preparation of the liquid phase for in each instance the icing is drawn through the pump which forces same at high velocity and high pressure through the homogenizing head and the recirculation continued until the mixture becomes smooth and uniform.

Figure 2:
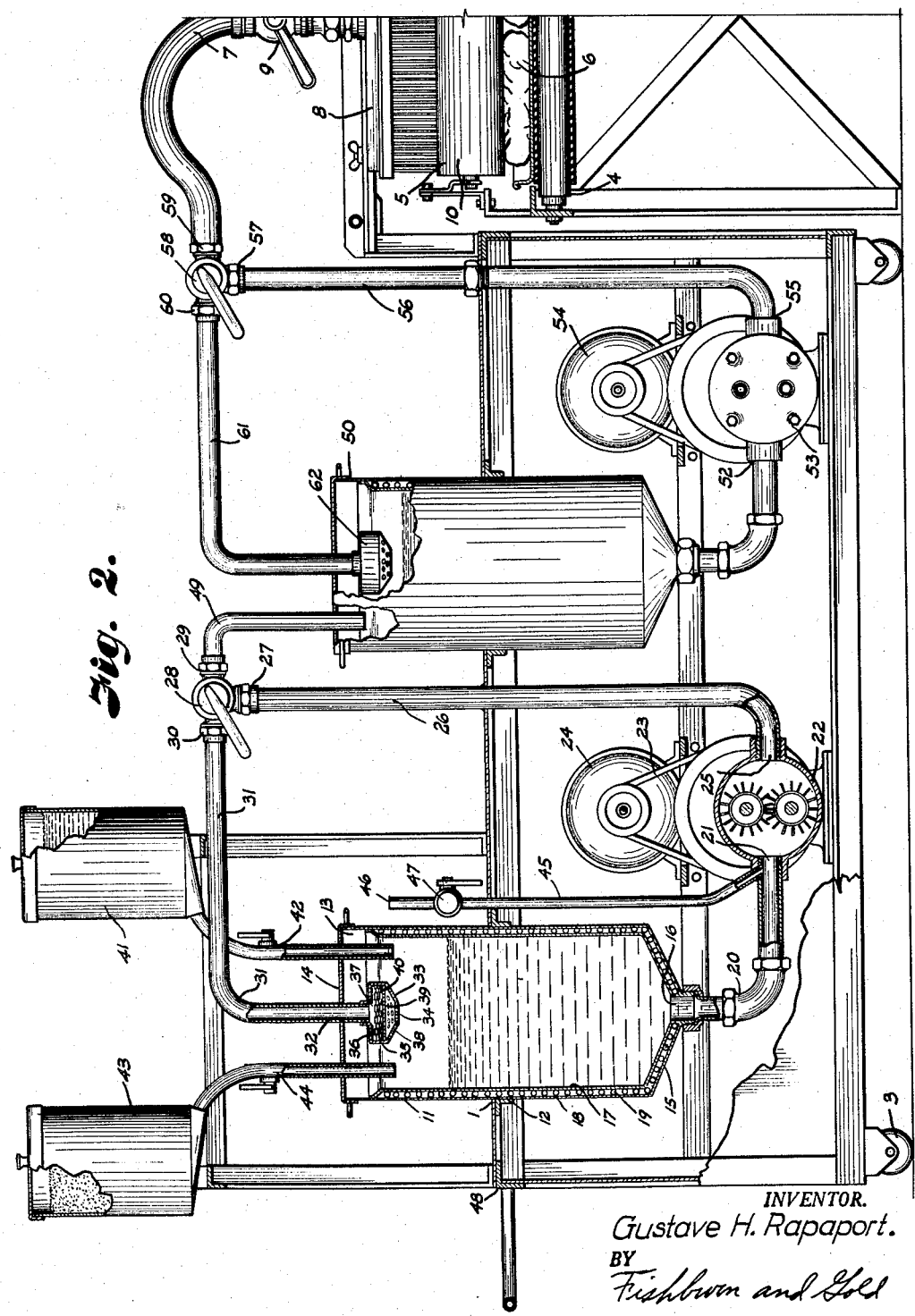
Fig. 2 is a modified form of the apparatus for semi-continuous production of the product.

The apparatus shown in Fig. 2 is for semi-continuous production of icings or the like and is similar to the structure shown in Fig. 1 in that the frame 48 supports the kettle 11, hoppers 41 and 43, pump 22 wherein the apparatus for mixing and recirculating the icing material is the same as shown and described in said Fig. 1, with the branch 29 of the valve 28 connected to a duct 49 which extends into the upper part of a second kettle 50. The second kettle 50 is substantially the same construction as the kettle 11 and has its drain connected by piping to the inlet 52 of a pump 53 driven by a motor 54, the pump having its outlet 55 connected by piping 56 to one branch 57 of a three-way valve 58, another branch 59 of said valve being connected to the tubing 7 for delivery of icing material to the icing applicator. The other branch 60 of the valve 58 is connected by piping 61 to a homogenizing head 62 in the upper portion of the kettle 50 whereby energization of the motor 54 operates the pump 53 to move the icing material through the piping 51, pump 53, piping 56, valve 58, piping 31, homogenizing head 62, to effect recirculation of the icing material, and the valve 58 may be operated to partially open flow through the branch 59 for partial delivery of the flow from the pump through the tubing 57 to the icing applicator, the remainder of the discharge flow from the pump being recirculated through the vessel 50.

In the operation of the apparatus shown in Fig. 2, the icing is prepared, mixed and recirculated through the kettle 11 and pump 22 until the uniformity and smoothness of the icing is obtained. Then the valve 28 is operated to direct the discharge of the pump 22 through the valve 28 and piping 49 to the vessel 50. After the kettle 11 is emptied, the valve 28 is turned to again deliver the pump discharge to the homogenizing head 33 and a new batch of ingredients placed in the kettle 11 for preparation of the icing. Then the pump 53 is operated to continue the recirculation of the icing material in the kettle 50 while a portion of the flow of the pump 53 is delivered to the icing applicator for application to baked goods on the conveyor apparatus 4. In this matter, the batches of icing are prepared and circulation thereof continued so that continuous application to the baked goods may be obtained.

In the form of the apparatus illustrated in Fig. 3, the air instead of being delivered to the inlet of the pump 22 is obtained from a suitable source of compressed air 63 and is delivered through a valve controlled duct 64 to substantially the inlet connection of the homogenizing head 33, the pressure of the air from the source being greater than the pressure in the fluid delivered by the pump 22 and the rate of delivery of the air to the homogenizing head being controlled by the valve 65. The remainder of the apparatus may be as shown and described in connection with Figs. 1 and 2.

The apparatus illustrated in Fig. 4 is a modified form of structure for introducing the dry or powdered material to the liquid phase of the product being prepared. The liquid phase of the the icing or the like is introduced to the kettle 11 in substantially the same manner as described in connection with Fig. 1, but the powder or dry phase of the icing or the like is contained in a hopper 66 having communication with a screw conveyor 67, the outlet of which communicates with the inlet of the pump 22. A suitable valve, such as a gate valve or the like, is arranged at the discharge end of the conveyor and adjacent the pump inlet whereby when the valve is closed, the liquid will not enter the screw conveyor, and when the valve 67 is opened and the screw conveyor driven, and the pump 22 operated, the powder or dry material is forced by the screw conveyor into the flow of liquid into the pump 22 to effect an intimate mixture between the dry ingredients and the liquid as it passes through the pump or other suitable colloid mill which crushes the particles of powdered sugar between the operating faces of the gears or other rotors in said pump or mill. After introduction of the dry material required by the formula into the liquid phase, the valve 68 is closed and circulation continued until the icing or the like is uniform and of smooth consistency. With this arrangement, the liquid phase of the formula is introduced into the kettle 11, drawn through the disintegrated mill or pump and circulated at high pressure, and then the powdered sugar or dry phase of the formula gradually added to the liquid and drawn through the mill or pumping unit and forced at high speed and high pressure through the small orifices and openings in the integrator or homogenizer head providing a shearing action which not only prevents the formation of lumps but results in the formation of a smoother and faster drying icing than can be achieved by the customary method. The repeated circulation of the liquid phase and finished icing through the mill or pump and small orifices of the homogenizer head produces a material in which a higher percentage of sugar remains in solution than can be obtained in the heretofore practiced methods, the remaining undissolved sugar particles being broken up to a smaller particle size and more intensely coated with a colloidal substance resulting in greater smoothness and better drying properties of the icing produced, and icings of good characteristics as to smoothness and drying properties may be produced by my method with 20 percent less sugar in the same amount of fluid content. Also the more perfect dispersion of the components in the icing material resulting from my process or a more complete imbibition of the water by the stabilizing substances prevents the common phenomena of setting up as it has been found that icings prepared by my process from the same formula as used by conventional processes are of improved clarity, flexibility and appearance and will dry or become non-tacky faster and will not set up, that is become brittle, lose their gloss, chip, crack and peel off, when the icing process is interrupted for a considerable time as is often necessary in commercial bakery operation. Also, with my process it is possible to reduce the amount of gelling components used in the preparation of icing bases and thus diminish the danger of syneresis which may be responsible for the exudation of liquid from the finished icings inside the wrapper known in the baking trade as "bleeding" or "sweating" of icings. It has also been found that by the application of my process it is also possible to use cold water in connection with some stabilizing bases composed of vegetable gums which heretofore had to be boiled to obtain a complete dispersion, and this from the point of uniform bakery operation permits a more accurate measurement of the amount of water added to the icing since the boil-off or loss in boiling due to evaporation which considerably varies from vessel to vessel according to size and steam pressure is eliminated in a product obtained which will always contain the exact amount of moisture.

In the making of cake batter, the structure shown in Fig. 3 is preferred, and the liquid phase consisting basically of water, milk, eggs, and the solid or dry phase consisting basically of flour, sugar, shortening, baking powders and flavoring materials, can be mixed either in sequence or by adding the ingredients together by the same system, or by feeding them separately into the kettle or pump in a predetermined proportion and by introducing the air through the integrator or homogenizing head. The circulation and passing of the material through the mill or pump and through the homogenizer or integrator head, a finer grained, finer textured and greater volume of cake batter is obtained.

It is to be understood that while I have described and illustrated certain forms of my invention, it is not to be limited to the specific form or arrangement of parts herein described and shown except insofar as such limitations are included in the claims.

What I claim and desire to secure by Letters Patent is:

1. The method of producing uniform mixtures of dry and liquid ingredients of bakery materials comprising, collecting the liquid phase of the materials in a confined space, effecting a circulation of the liquid from the confined space through a passage and back to the confined space, forcing the liquid at relatively high pressure through a plurality of restricted areas to form a plurality of separate streams in the circulation thereof, then feeding the dry powder phase of the materials into the liquid in the confined space whereby said dry powder phase of the materials is moved with the liquid through the passage, subjecting the combined powder and liquid to crushing and wiping action between two relatively moving surfaces during the circulation of said bakery materials, forcing the mixture of liquid and powder through said plurality of restricted areas to form a plurality of separate streams thereof in the circulation, continuing the circulation until the liquid and powder is combined and integrated in a substantially uniform, homogeneous, flowable mixture, and then introducing air into homogeneous flowable mixture as it is circulated through the passage.

2. The method of producing uniform mixtures of dry and liquid ingredients of bakery materials comprising, mixing the liquid phase of the materials, placing said liquid phase in a confined space, effecting a circulation of the liquid from the confined space through a passage and back to the confined space, forcing the liquid at relatively high pressure through a plurality of restricted areas to form a plurality of separate streams thereof in the circulation, then gradually introducing the dry powder phase of the materials into the liquid in said confined space whereby said dry powder phase of the materials is moved with the liquid through the passage, subjecting the combined powder and liquid to crushing and wiping action between two relatively moving surfaces during the circulation of said bakery materials, forcing the mixture of liquid and powder at relatively high pressure and velocity through said plurality of restricted areas to form a plurality of separate streams thereof in the circulation, continuing the circulation until the liquid and powder is combined and integrated in a substantially uniform homogeneous, flowable mixture, then introducing air into homogeneous flowable mixture as it is circulated through the passage until said air is thoroughly distributed in said mixture, separating a portion of the circulating mixture and applying same to baked goods, and continuing the circulation during the application of the mixture to the baked goods.

3. Apparatus for making uniform mixtures of dry and liquid ingredients for baked goods and the like comprising, a frame, a container adapted to receive liquid ingredients supported on the frame and having a drain connection in the lower portion thereof, a pump supported on the frame and having inlet and outlet connections, a duct connecting the container drain connection and pump inlet to provide communication therebetween, said pump having operating members with relatively moving substantially engaging surfaces, a homogenizing head having a plurality of small apertures for restricting flow therethrough, a second duct connected with the pump outlet and the homogenizing head to provide communication therebetween, means driving the pump whereby material is drawn from the container and subjected to crushing and wiping action between the relatively moving surfaces of the pump and forced at relatively high pressure and high velocity to the homogenizing head which separates the flow into a plurality of small separate streams, means supporting the homogenizing head whereby material forced therethrough is returned to the container for recirculation through the pump, means for introducing dry powdered ingredients into the liquid during circulation thereof, a discharge duct having communication with the second duct, means controlling flow through the second and discharge duct whereby a portion of the flow from the pump is delivered to the discharge duct, air introducing means connected with a source of air and having communication with one of the flow ducts for introducing air into the material flowing therethrough, and valve means controlling said air introducing means.

4. Apparatus for making icings for baked goods and the like and adapted to be used with icing applicators wherein the icing is delivered under pressure to a delivery controlled applicator which transfers the icing to baked goods comprising, a frame adapted to be positioned adjacent the icing applicator, a container adapted to receive liquid ingredients of the icing supported on the frame and having a drain connection in the lower portion thereof, a pump supported on the frame and having inlet and outlet connections, a duct connecting the container drain connection and pump inlet to provide communication therebetween, said pump having operating members with relatively moving substantially engaging surfaces, a homogenizing head having a plurality of small apertures for restricting flow therethrough, a second duct connected with the pump outlet and the homogenizing head to provide communication therebetween, means driving the pump whereby material is drawn from the container and subjected to crushing and wiping action between the relatively moving surfaces of the pump and forced at relatively high pressure and high velocity to the homogenizing head which separates the flow into a plurality of small separate streams, means supporting the homogenizing head whereby material forced therethrough is returned to the container for recirculation through the pump, a third duct having communication with the second duct and connected with the icing applicator, means controlling flow through the second and third duct whereby a portion of the flow from the pump is delivered to the icing applicator, means connected with a source of air and having communication with one of the flow ducts for introducing air into the material flowing therethrough, a hopper for containing dry material, a spiral conveyor positioned to receive dry powdered material from the hopper and having a discharge connected with the flow passage adjacent the inlet of the pump for forcing dry material into the liquid flowing therethrough, and valve means at the discharge of the conveyor for controlling communication between the discharge of the conveyor and the flow passage.

References Cited in the file of this patent

UNITED STATES PATENTS

| | | |
|---|---|---|
| 1,524,636 | Bausman | Jan. 27, 1925 |
| 1,671,868 | McGougan et al. | May 29, 1928 |
| 1,973,778 | Price | Sept. 18, 1934 |
| 2,023,741 | Moir | Dec. 10, 1935 |
| 2,271,654 | Littlefield | Feb. 3, 1942 |
| 2,277,120 | Lindsey | Mar. 24, 1942 |
| 2,554,143 | Hinz et al. | May 22, 1951 |
| 2,572,049 | Oakes | Oct. 23, 1951 |